United States Patent Office 3,547,690
Patented Dec. 15, 1970

3,547,690
PROCESS FOR CONTROLLING FABRIC HARDNESS BY IMPREGNATING WITH A LATEX
Richard G. Nickerson and Richard George McAllister, Worcester, Mass., and Jack Dickstein, Huntingdon Valley, Pa., assignors to Borden, Inc., New York, N.Y., a corporation of New Jersey
No Drawing. Filed Apr. 16, 1968, Ser. No. 721,577
Int. Cl. B32b 27/04; D06n 15/30
U.S. Cl. 117—139.5                          18 Claims

ABSTRACT OF THE DISCLOSURE

This invention relates to a process for controlling the degree of fabric hardness and rendering said fabric hardness impervious to solvents normally used in the dry cleaning process. More particularly, this invention relates to a process as aforesaid wherein a polymer latex emulsion is prepared in the presence of a hydroxyalkyl alkyl maleate or fumarate and thereafter the resultant polymer latex is impregnated onto a fabric-like substrate.

The term "fabric-like substrate" includes fibrous materials such as paper and cotton as well as impregnable synthetics.

BACKGROUND OF THE INVENTION

When fabric-like materials are used for many purposes, the degree of hardness of the material is not suitable for the intended end use of the fabric. Therefore, the fabric-like substrate must be impregnated with a substance which will adjust the hardness of the fabric to that which is desired. After the hardness is adjusted, it must be able to withstand laundering, temperature variations and normal use.

SUMMARY OF THE DISCLOSURE

Broadly, this invention contemplates a process for controlling the degree of hardness of a fabric-like substrate in a substantially permanent manner impervious to dry-cleaning and laundering media comprising the steps of impregnating onto said substrate a polymer latex emulsion prepared by emulsifying in an aqueous medium, a vinyl monomer in an amount up to about 20% of said vinyl ester monomer to be added; said emulsification being accomplished in the presence of surfactant and protective colloid, incorporating a polymerization catalyst therein, heating said emulsion to a temperature of from about 30° C. to about 100° C. for from about ¾ hour to about 2½ hours, slowly adding the balance of said vinyl ester monomer and up to about 25% of a hydroxyalkyl alkyl ester selected from the class consisting of maleate and fumarate esters, wherein said hydroxylalkyl group has up to about 4 carbon atoms and said alkyl group has up to about 8 carbon atoms and maintaining said temperature until polymerization is substantially complete, and impregnating said substrate with the resultant polymer latex, and curing said impregnated substrate at a temperature of up to about 425 F. for up to about 20 minutes.

DETAILED DESCRIPTION OF THE INVENTION

All percentages expressed herein, unless otherwise specified, are percents by weight based on the solids content of the monomer composition.

A fabric-like substrate is impregnated with a polymer latex emulsion. Thereafter the substrate is heat cured at a temperature of from about 200° F. to about 425° F. for a period of time of from about 10 seconds to about 20 minutes. The resultant cured impregnated substrate is thereby impervious to removal of the impregnating composition by normal laundering or dry cleaning solvents.

The above property of resistance to dry cleaning and laundering media may be attributed to the presence of up to about 25% of a hydroxyalkyl alkyl maleate or fumarate during the preparation of the polymer latex. The hydroxyalkyl alkyl ester used provides additional cross-linking cites thereby contributing to the resistance of the impregnating composition to dry cleaning and laundering materials.

Any hydroxyalkyl alkyl maleate or fumarate may be used wherein the hydroxyalkyl group has up to about 4 carbon atoms and the alkyl group has up to about 8 carbon atoms. Thus, one may use hydroxypropyl butyl maleate, hydroxylpropyl octyl maleate, hydroxyethyl ethyl maleate, hydroxypropyl hexyl maleate, hydroxybutyl ethyl fumarate, hydroxyethyl butyl fumarate, hydroyethyl octyl fumarate, and the like.

During the preparation of the polymer latex the hydroxyalkyl alkyl ester is added subsequent to or simultaneous with the addition of the total vinyl ester monomer used.

The process of preparing the polymer latex may be carried out as follows. A protective colloid such as polyvinyl alcohol, hydroxypropyl cellulose, gelatin, polyacrylamides, polysodium acrylates and the like is used in amounts of up to about 1%.

A surfactant is also preferably employed, both initially as well as during the reaction, to prevent the latex from coagulating. Among the surfactants which may be used in amounts of from about 0.1 to about 5% are nonylphenol terminated with ethylene oxide, sodium lauryl sulfate, sodium dodecyl benzene sulfonate, tetrasodium N-(1,2-dicarboxyethyl) N-octadecyl sulfosuccinamate, sodium salt of sulfonated nonyl phenyl terminated with 40 moles of ethylene oxide and the like.

A buffer may also be used to keep the pH of the composition, during and after polymerization, at between 3 and 6.5. Among the buffers which may be used are sodium bicarbonate, ammonium hydroxide, sodium hydroxide, potassium hydroxide, sodium phosphates, potassium phosphate and the like.

The monomer used, in the amount of up to about 95% of the entire solids composition, is vinyl acetate, vinyl propionate, vinyl butyrate, and the like.

Up to about 20% of the vinyl ester monomer is added initially. Thereafter, the balance of the monomer used is added after heating has commenced and after a polymerization catalyst has been incorporated therein.

Among the polymerization catalysts which may be used in an amount of from about 0.02 to about 1½% are ammonium persulfate, potassium persulfate, sodium persulfate, hydrogen peroxide, tert-butyl hydroperoxide and the like.

From about 0.1 to about 0.5% of a reducing agent may comprise part of the catalyst system. Among the reducing agents which may be used are sodium bisulfite, sodium metabisulfite, sodium thiosulfite, ammonium thiosulfite, sodium formaldehyde sulfoxylate, ammonium formaldehyde sulfoxylate, zinc formaldehyde sulfoxylate, ascorbic acid, fructose, galactose and the like.

A polymerization accelerator for low temperature polymerization is also used in an amount of up to about 1%. Among the polymerization accelerators used may be mentioned triethanolamine, ferrous sulfate and the like.

If desired, a softening comonomer may be incorporated with the vinyl ester monomer. The softening comonomer can comprise up to about 60% of the composition. Among the softening comonomers used, may be mentioned 2-ethylhexyl acrylate, methyl acrylate, butyl acrylate, decyl acrylate, maleate and fumarate esters such as ethyl, butyl, octyl, and decyl; and the like. The greater the ratio of softening comonomer to vinyl ester the softer will be the impregnated fabric.

It is often desirable to increase the cross-linking capacity of the reactants involved. In order to accomplish increased cross-linking capacity, an acid is often added in an amount of from about 0.3% to about 5% to introduce carboxyl functionality thereby increasing cross-linking capacity.

Among the materials which may be used to introduce carboxyl functionality are acrylic acid, crotonic acid, fumaric acid, maleic anhydride, monobutyl maleate, and the like.

If desired, the molecular weight of the final polymer may be modified, thereby further improving solvent resistance, by adding to the reaction from about 0.02% to about 5% of a cross-linking agent such as diallyl maleate, butanediol-1,4 divinyl ether, trimethylol propane trimethacrylate and the like.

The cross-linking agent is preferably added as part of the monomer composition itself, although it may be added after completion of the monomer addition.

The polymerization reaction itself is run at a temperature of from about 30° C. to about 100° C. for up to about 6 hours.

When impregnating the fabric it is advantageous to use from about 1 to about 10% of a diepoxide such as glycerol having 2 to 3 epichlorohydrin units, tetraethylene glycol terminated with epichlorohydrin, bisphenol-A terminated with epichlorohydrin and the like in a predispersed form with from about 0.2% to about 2% of a catalyst such as magnesium chloride, ammonium nitrate, ammonium chloride, calcium nitrate, aluminum nitrate, zinc nitrate and the like. These may be added to the resultant polymer latex just prior to impregnating the substrate. Such additions will increase the solvent resistance of the impregnated substrate.

If desired, solvent resistance may be further enhanced by adding a material such as urea, urea formaldehyde, melamine formaldehyde and the like. These substances react with the hydroxyl group of the polymer latex. Because of the reactivity of the above and like materials, they should be added to the latex just before impregnating the substrate. If added to the latex and stored, they will react with the hydroxyl groups of the latex over a period of time and will thereby thicken the latex and render it unuseable.

Impregnation of the substrate is accomplished in any suitable manner such as by spraying, dipping, etc., and thereafter the impregnated substrate is cured at temperatures of up to about 350° F. for up to about 20 minutes.

In order to more fully illustrate the nature of this invention and the maner of practicing the same, the following examples are presented.

EXAMPLE 1

In an appropriate flask was placed 600 grams water, 0.2 g. polyvinyl alcohol (5-88 type), 6 g. triethanol amine, 3 g. nonylphenol terminated with 40 moles ethylene oxide, 4 g. sodium salt of sulfonated nonylphenol terminated with 40 moles ethylene oxide, and 1 g. sodium bicarbonate. To the water phase was added half of a solution containing 330 g. vinyl acetate, 150 g. 2-ethylhexyl acrylate, 18 grams monobutyl maleate, 3 g. nonylphenol terminated with 40 moles ethylene oxide and 120 g. hydroxypropylbutyl maleate over one hour. In 10 g. of water was added 0.6 g. ammonium persulfate and 0.2 g. sodium bicarbonate, as well as a solution of 10 g. H₂O and 0.$ g. sodium bisulfite. The mixture was heated to 30–45° C. and held at 45° C. for 1.5 hours before feeding the balance of monomers to the reaction mixture over a period of two hours. During the feed time, persulfate and bisulfite up to fixe times the original amount may be added to maintain a smooth reaction. The latex product had 45.0% solids, 6.5 pH, with Brookfield viscosity of 60 cps.

The resultant polymer latex was then sprayed onto a cotton fabric. The cotton fabric was dried and heat cured at 300° F. for 10 minutes. The dried-cured fabric had a harder feel to it than before it was sprayed.

The impregnation of the fabric could not be removed in hot trichloroethylene or in a hot detergent-water mixture.

EXAMPLE 2

The procedure of Example 1 is repeated several times except that 1 and 2% respectively of glycerol epoxidized with 2 and 3 units respectively of epichlorohydrin and a catalyst of a magnesium chloride is added to the polymer latex prior to impregnating the fabric substrate.

In each instance good results are obtained.

EXAMPLE 3

The procedure of Example 1 is repeated several times except that vinyl propionate and vinyl butyrate is used in amounts of 35 and 85% respectively.

EXAMPLE 4

The procedure of Example 1 is repeated several times except that an acid is added. The acids used in the following amounts are acrylic acid (1.5%), crotonic acid (3%), fumaric acid (0.3%), monobutyl maleate (4%), and maleic anhydride (5%).

EXAMPLE 5

The procedure of Example 1 is repeated except that the softening comonomer is varied. Butyl maleate, decyl acrylate, and ethyl, butyl, and octyl fumarate is used in amounts respectively of 10%, 20%, 30%, 40% and 55%.

EXAMPLE 6

The procedure of Example 1 is repeated except that the hydroxyalkyl alkyl ester used is varied. Hydropropylbutyl maleate, hydroxypropyloctyl maleate and hydroxylpropylhexyl maleate is used in amounts respectively of 10%, 17% and 25%.

EXAMPLE 7

The procedure of Example 1 is repeated several times except that in each instance, the hydroxyalkyl alkyl ester used is varied. The hydroxyalkyl alkyl esters used are hydroxybutyl ethyl fumarate, hydroxyethyl butyl fumarate, and hydroxyethyl octyl fumarate.

EXAMPLE 8

The procedure of Example 1 is repeated except that the protective colloid used is varied. The protective colloids used are polyvinyl alcohol, gelatin, hydroxyethyl cellulose in amounts respectively of 0.1%, 0.5% and 1%.

EXAMPLE 9

The procedure of Example 1 is repeated except that the reaction is run at a temperature of 85° C.

What is claimed is:

1. A process for controlling the degree of hardness of a fabric-like substrate in a substantially permanent manner impervious to dry cleaning and laundering media comprising the steps of (A) impregnating said substrate with a polymer latex emulsion, the polymer of said emulsion having comonomers consisting essentially of a vinyl ester monomer and a hydroxyalkyl alkyl ester, said polymer latex emulsion being prepared by
   (1) emulsifying in an aqueous medium said vinyl ester monomer in an amount up to about 20% of said vinyl ester monomer to be added; said emulsification being accomplished in the presence of surfactant and protective colloid,
   (2) incorporating a polymerization catalyst therein,
   (3) heating said emulsion to a temperature of from about 30° C. to about 100° C. for from about ¾ hour to about 2½ hours,
   (4) slowly adding the balance of said vinyl ester monomer and up to about 25% of said hydroxyalkyl alkyl ester selected from the class consisting of maleate and fumarate esters wherein said hydroxyalkyl group has up to about 4 carbon atoms and said alkyl group has up to about 8 carbon atoms and maintaining said temperature until polymerization is substantially complete, and (B) curing the impregnated substrate at a temperature of up to about 425° F. for up to about 20 minutes.

2. A process according to claim 1, wherein a diepoxide and catalyst is added to the polymer latex product before impregnation of said substrate.

3. A process according to claim 1 wherein said hydroxyalkyl alkyl ester is hydroxypropyl butyl maleate.

4. A process according to claim 1 wherein from about 0.2% to about 5% of a cross-linking agent is added to the monomer latex emulsion.

5. A process according to claim 4, wherein said cross-linking agent is butanediol-1,4 divinyl ether in an amount of 0.2%.

6. A process according to claim 1 wherein up to about 60% of a softening comonomer is added subsequent to the addition of the balance of said vinyl ester monomer.

7. A process according to claim 1 wherein up to about 5% of a surfactant is present.

8. A process according to claim 1 wherein up to about 1% of a protective colloid is present.

9. A process according to claim 1 wherein said vinyl ester monomer is vinyl acetate.

10. A process according to claim 1, wherein from about 0.3% to about 5% of an acid is present during preparation of said latex emulsion.

11. A process according to claim 10, wherein said acid is acrylic acid.

12. A process for controlling the degree of hardness of a fabric-like substrate in a substantially permanent manner impervious to dry cleaning and laundering media comprising the steps of (A) impregnating said substrate with a polymer latex emulsion prepared by
  (1) emulsifying in an aqueous medium a vinyl ester monomer in an amount up to about 20% of said vinyl ester monomer to be added and up to about 60% of the total composition of a softening comonomer selected from the group consisting of acrylate esters, fumarate esters, and maleate esters; said emulsification being accomplished in the presence of a surfactant and a protective colloid,
  (2) incorporating a polymerization catalyst therein,
  (3) heating said emulsion to a temperature of from about 30° C. to about 100° C. for from about ¾ hour to about 2½ hours,
  (4) slowly adding the balance of said vinyl ester monomer and up to about 25% of an hydroxyalkyl alkyl ester selected from the class consisting of maleate and fumarate esters wherein said hydroxyalkyl group has up to about 4 carbon atoms and said alkyl group has up to about 8 carbon atoms and maintaining said temperature until polymerization is substantially complete, and (B) curing the impregnated substrate at a temperature of up to about 425° F. for up to about 20 minutes.

13. A process of claim 12 wherein said curing step is carried out at a temperature of 200° F. to 425° F. in about 10 seconds to about 20 minutes.

14. A process of claim 13 including the step of adding a buffer to said polymer latex to maintain the pH thereof during and after polymerization at between 3 and 6.5.

15. A process of claim 14 including the step of adding a polymerization catalyst to said polymer latex in an amount of 0.02 to 1.5% of the total composition, amount of said protective colloid being up to 1% and amount of said surfactant being in the range of 0.1% to 5%.

16. A process of claim 15 wherein said polymerization catalyst includes 0.1 to 0.5% of a reducing agent, said process further including the step of adding to said polymer latex a polymerization accelerator for low temperature polymerization in an amount of about 1%.

17. A process of claim 16 including the step of adding to said polymer latex from 0.3% to 5% of an agent for increasing cross-linking capacity of the reactants and from 0.2% to 5% of a cross-linking agent for modifying molecular weight of the final polymer thereby further improving solvent resistance of said impregnated substrate.

18. A process of claim 12 wherein amount of the total vinyl ester monomer added is up to about 95% of the entire solids composition, said monomer being selected from the group consisting of vinyl acetate, vinyl propionate and vinyl butyrate.

References Cited

UNITED STATES PATENTS

| | | | |
|---|---|---|---|
| 2,406,454 | 8/1946 | Charlton et al. | 117—139.5 |
| 2,799,914 | 7/1957 | Nickerson | 117—139.5X |
| 2,806,008 | 9/1957 | McNulty et al. | 260—29.6X |
| 2,819,237 | 1/1958 | Daniel | 117—161X |
| 3,083,118 | 3/1963 | Bridgeford | 117—622X |
| 3,330,814 | 7/1967 | Vasta | 117—161X |

WILLIAM D. MARTIN, Primary Examiner

M. R. P. PERRONE, Jr., Assistant Examiner

U.S. Cl. X.R.

117—143, 155, 161; 260—29.6